(12) United States Patent
Sethu

(10) Patent No.: US 7,135,859 B2
(45) Date of Patent: Nov. 14, 2006

(54) ROTARY AND ANGULAR POSITION SENSING

(76) Inventor: Murugesan Sethu, 3B-18-01 N-Park Condominium, Jalan Batu Uban, Gelugor, 11700, Penang (MY)

(*) Notice: Subject to any disclaimer, the term of this patent is extended or adjusted under 35 U.S.C. 154(b) by 306 days.

(21) Appl. No.: 10/819,000

(22) Filed: Apr. 6, 2004

(65) Prior Publication Data

US 2005/0218888 A1 Oct. 6, 2005

(51) Int. Cl.
G01B 7/30 (2006.01)
G01B 33/09 (2006.01)
G11B 15/06 (2006.01)

(52) U.S. Cl. .............................. 324/207.25; 324/207.21

(58) Field of Classification Search ........... 324/207.21, 324/207.25, 207.24, 252; 360/246.6, 63, 360/73.03
See application file for complete search history.

(56) References Cited

U.S. PATENT DOCUMENTS

| | | | | |
|---|---|---|---|---|
| 3,187,317 A | * | 6/1965 | Smith, Jr. ................. | 360/77.11 |
| 5,629,682 A | * | 5/1997 | Hylton et al. ............... | 340/671 |
| 5,909,336 A | * | 6/1999 | Schaffner et al. ......... | 360/77.08 |
| 5,982,171 A | | 11/1999 | Umemoto et al. | |
| 6,304,406 B1 | * | 10/2001 | Douglas et al. .......... | 360/73.03 |
| 6,326,780 B1 | | 12/2001 | Striker | |
| 6,484,751 B1 | | 11/2002 | Lafler et al. | |
| 6,566,872 B1 | | 5/2003 | Sugitani | |
| 6,580,587 B1 | * | 6/2003 | Everitt ........................ | 360/324 |
| 6,707,632 B1 | * | 3/2004 | Raphael et al. ............... | 360/75 |
| 6,812,694 B1 | * | 11/2004 | Uenoyama ............. | 324/207.22 |
| 2002/0135927 A1 | * | 9/2002 | Yatsu ......................... | 360/75 |
| 2002/0180433 A1 | | 12/2002 | Van Zon et al. ............ | 324/252 |
| 2002/0190681 A1 | * | 12/2002 | Nakatani ..................... | 318/560 |

* cited by examiner

Primary Examiner—Edward Lefkowitz
Assistant Examiner—Kenneth J. Whittington

(57) ABSTRACT

A device monitors angular position. The device includes a media platter and a magneto-resistance sensor. The media platter includes a track of data encoded on a surface of the media platter. The magneto-resistance sensor is located adjacent to the media platter and situated so that resistance of a magneto-resistant device within the magneto-resistance sensor is affected by rotation of the media platter.

20 Claims, 10 Drawing Sheets

ROTARY AND ANGULAR POSITION SENSING

BACKGROUND

The present invention relates to sensing rotary and angular position.

Giant magneto-resistance (GMR) sensors have been used with north-south pole magnets for rotary position sensing. For example, a GMR sensor is placed directly above magnet poles or at the circumference of a magnetic disk composed of multiple magnets having north-south magnet poles. In order to increase resolution of position detection, the number of north-south pole pairs can be increased or more than one GMR sensor can be used for interpolation. The achievable resolution is limited by the number of north-south pole magnet sections that can be created on a magnetic disk and/or the density that GMR sensors can be fabricated to detect the north-south pole pairs created on the magnetic disk.

SUMMARY OF THE INVENTION

In accordance with an embodiment of the present invention, a device monitors angular position. The device includes a media platter and a magneto-resistance sensor. The media platter includes a track of data encoded on a surface of the media platter. The magneto-resistance sensor is located adjacent to the media platter and situated so that resistance of a magneto-resistant device within the magneto-resistance sensor is affected by rotation of the media platter with magnetic pattern.

DESCRIPTION OF THE EMBODIMENT

Figure 1:
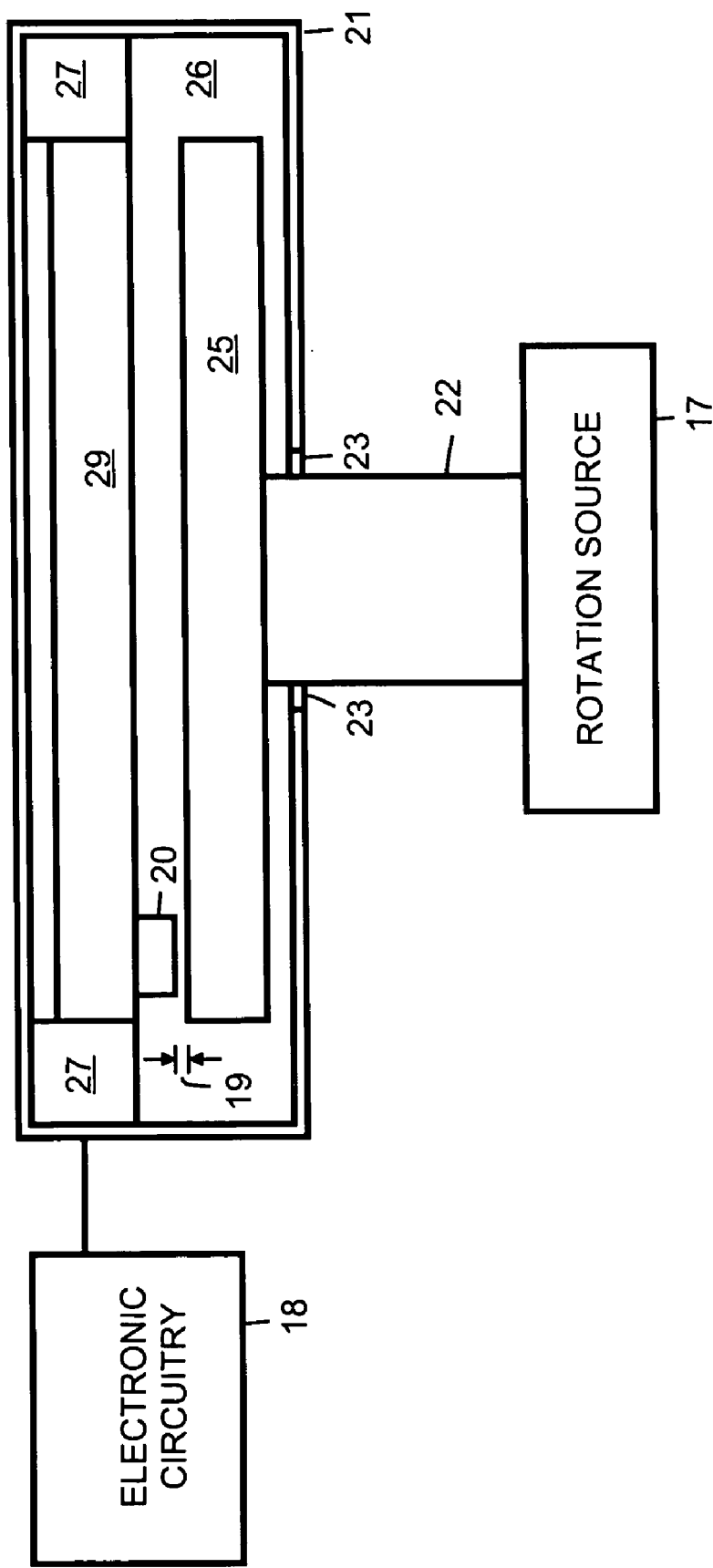
FIG. 1 is a simplified side view of a rotary and angular position sensor in accordance with an embodiment of the present invention.

FIG. 1 is a simplified side view of a rotary and angular position sensor. Within housing 21, a media platter 25 is connected to an encoder shaft 22. For example, the encoder shaft 22 is connectable to a rotation source 17. For example, rotation source 17 is a motor or other entity that requires position sensing for a rotating motion. Bearings 23 facilitate rotation of encoder shaft 22. A panel 29 is mounted on housing 21 using rigid mount 27. A giant magneto-resistance (GMR) sensor 20 is mounted on panel 29 with a gap 19 separating GMR sensor 20 from magnetic platter 25. For example, gap 19 is less than half the pitch distance of data. The medium located between GMR sensor 20 and magnetic platter 25 is a non-magnetically-shielding material such as air. Other supporting electronics, etc., can also be mounted onto panel 29. Electronic circuitry 18 is used to receive information from GMR sensor 20 and interpret position or position change.

Figure 2:
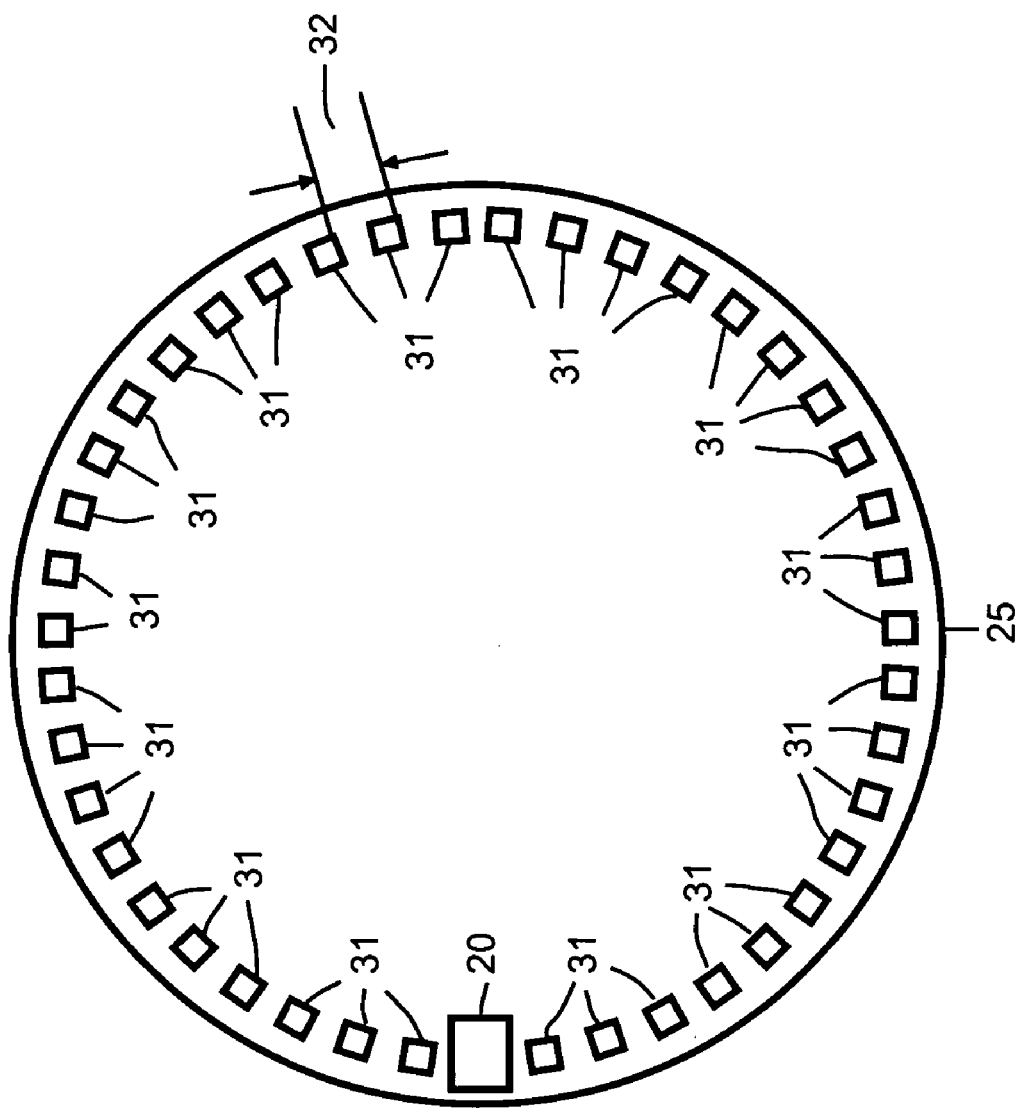
FIG. 2 is a simplified top view of a media platter within a rotary and angular position sensor in accordance with an embodiment of the present invention.

FIG. 2 is a simplified top view of media platter 25. For example, media platter 25 is a disk formed of glass and/or metallic material with a coating of thin film material. A location of GMR sensor 20 is shown. For example, the thin film material is FeO or some other material that possesses magnetic properties. A track of data is patterned onto media platter 25. For example, the data track consists of locations 31 magnetized with a south pole orientation or a north pole orientation perpendicular to the surface of media platter, or alternatively, in plane to the surface of the media platter. When pole orientation is perpendicular to the surface of the media, a current perpendicular to plane (CPP) GMR sensor is used. When pole orientation is in plane to the surface of the media, a current in plane (CIP) GMR sensor is used.

For example, adjacent locations 31 within the track are alternately magnetized with south pole orientation and north pole orientation. In an alternative embodiment, locations 31 are magnetized with a varying magnetic field perpendicular to the surface of media platter 25.

For example, the data track is patterned utilizing a servo writer, ion beam projection, or some other means of creating a magnetic pole at each location 31. The location and size of locations 31 on the data track are only illustrative and are not to scale. As will be understood by persons of ordinary skill in the art, the size and density of locations 31 can be created, for example, consistent with currently available hard disk drive technology.

Rotation of media platter 25 subjects GMR sensor 25 to a variable magnetic field. The output voltage of GMR sensor 25 is fed into electronic circuitry 18 for position or position change interpretation.

When, for example, locations 31 consist of an alternating north-south pole pattern along the data track, an oscillating pattern is detected by GMR sensor 25 when media platter 25 is rotating. Monitoring the oscillating pattern allows determination of a current angular position of media platter 25.

For example, GMR sensor 25 is implemented using a half-bridge circuit arrangement allowing digital counting of oscillation peaks. This allows resolution of angular position based on pitch 32 of locations 31. Alternatively, GMR sensor 25 can be implemented using a full-bridge circuit arrangement. The resulting signal facilitates interpolation of positioning and allows greater angular position resolution than the pitch of locations 31.

Figure 3:
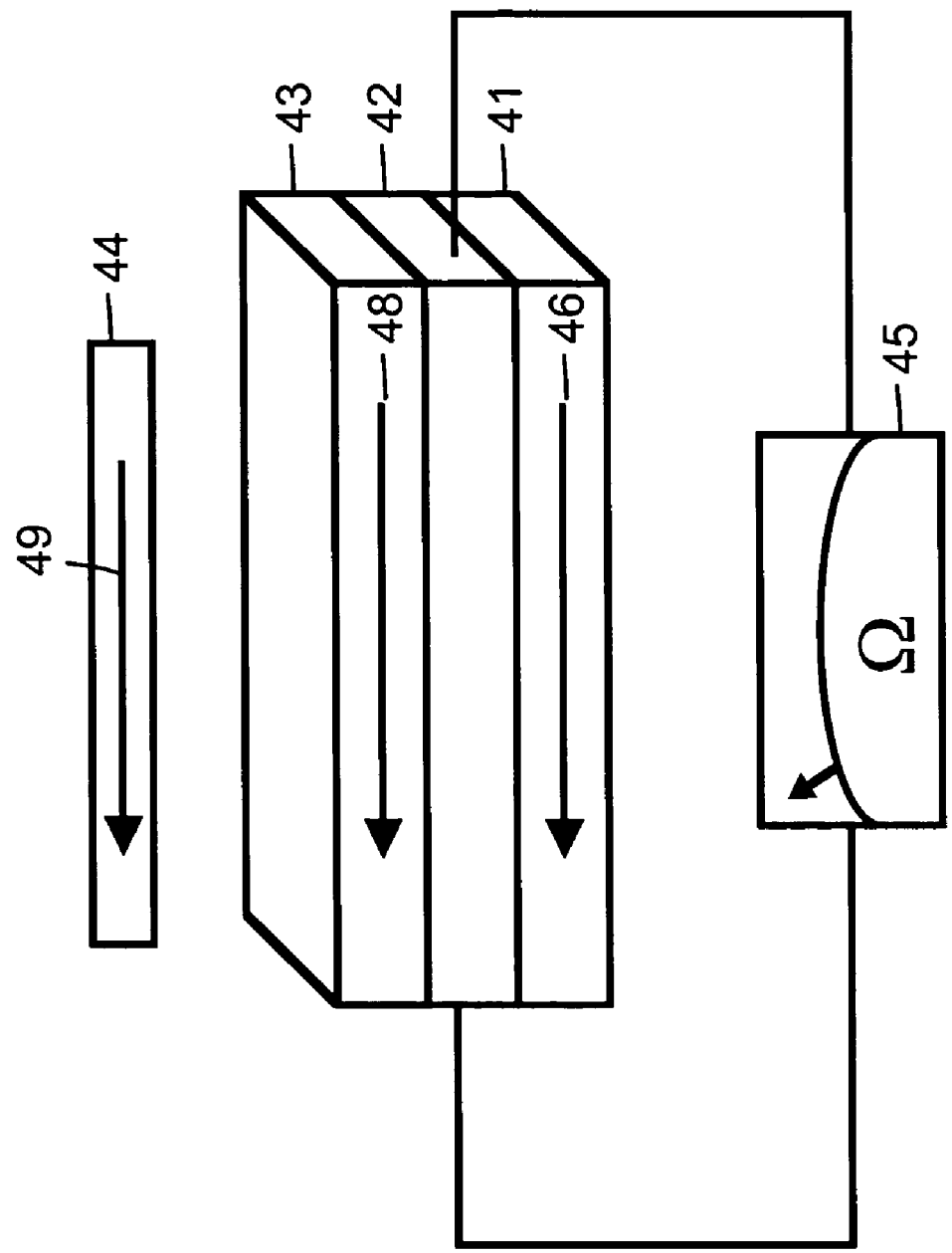
FIG. 3, FIG. 4, FIG. 5 and FIG. 6 are simplified block diagrams illustrating operation of a giant magneto-resistance sensor.

In FIG. 3, an example GMR device is shown to include hard magnetic material 41, a conductive layer 42 and a soft magnetic material 43. Hard magnetic material 41 retains a fixed magnetic moment. The direction of the fixed magnetic moment is indicated by an arrow 46. For example, hard magnetic material 41 is made of cobalt (Co) or some other material that is able to retain a fixed magnetic moment.

Soft magnetic material 43 has a variable magnetic moment. The current direction of the variable magnetic moment is indicated by an arrow 48. For example, soft magnetic material 43 is made of NiFe or some other material that has a variable magnetic moment. For example, conductive layer 42 is composed of copper (Cu) or some other material that is able to conduct electricity.

An external electric field, illustrated by an arrow 49 within a box 44, affects the direction of the magnetic moment of soft magnetic material 43 and thus affects the resistivity of the GMR device. As illustrated by arrows 48 and 49, the magnetic moment of soft magnetic material 43 aligns with the magnetic moment of the external field. When the magnetic moment of soft magnetic material 43 aligns with the magnetic moment of hard magnetic material 41, as illustrated by arrow 48 pointing in the same direction as arrow 46, then the resistivity through conductive material 42 is minimized, as illustrated by an ohmmeter 45.

Figure 4:
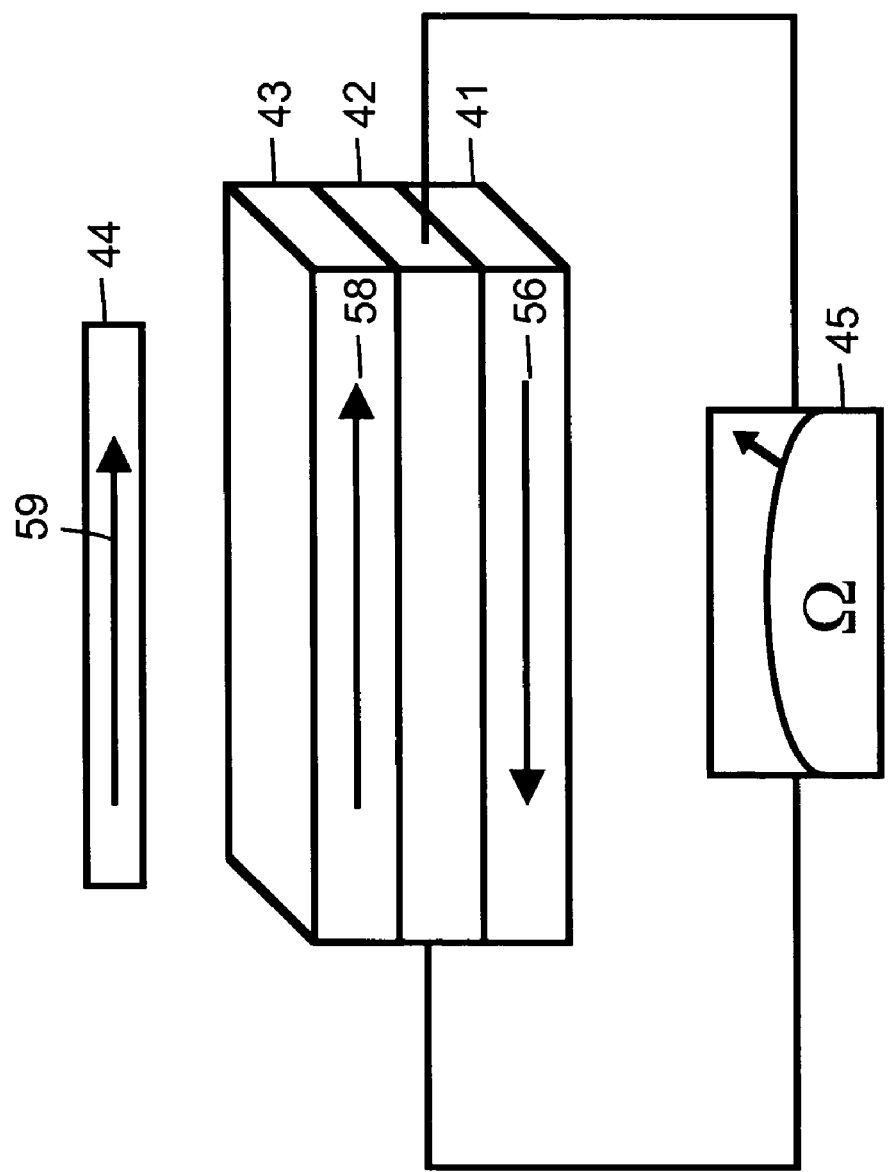

In FIG. 4, the GMR device is again shown. An external electric field, illustrated by an arrow 59 within box 44, affects the direction of the magnetic moment of soft magnetic material 43 and thus affects the resistivity of the GMR device. As illustrated by arrows 58 and 59, the magnetic moment of soft magnetic material 43 aligns with the magnetic moment of the external field. When the magnetic moment of soft magnetic material 43 does not align with the magnetic moment of hard magnetic material 41, as illustrated by arrow 58 pointing in the opposite direction of arrow 56, the resistivity through conductive material 42 is increased, as illustrated by ohmmeter 45.

Figure 5:
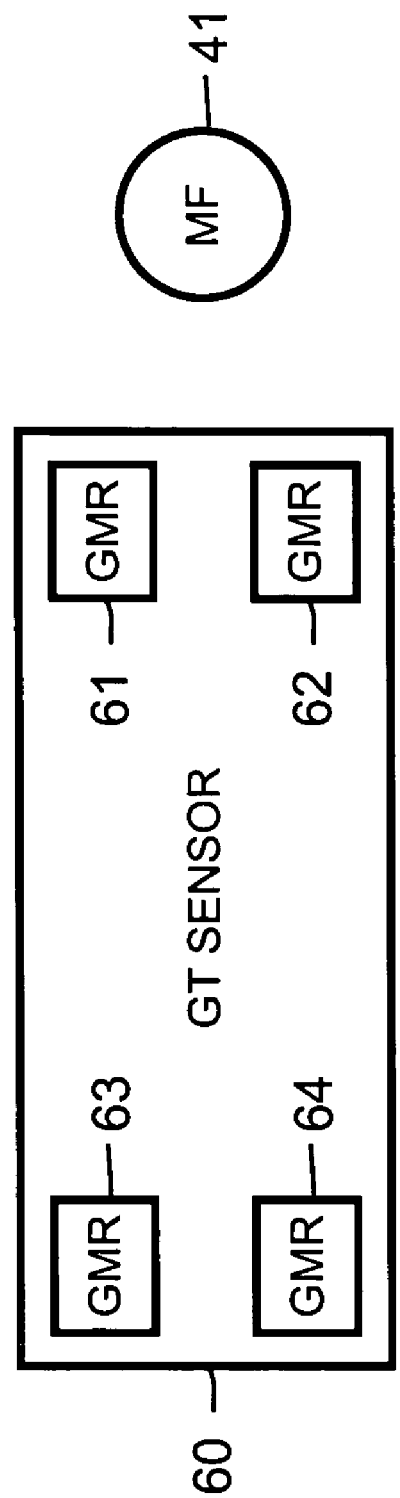

FIG. 5 shows a simplified block diagram of an example GMR sensor 60. GMR sensor 60 includes a GMR device 61, a GMR device 62, a GMR device 63 and a GMR device 64 relatively situated within GMR sensor 60 as shown. GMR device 61 is located closer to a magnetic field (MF) source 41 than GMR device 63. GMR device 62 is located closer to magnetic field source 41 than GMR device 64.

Figure 6:
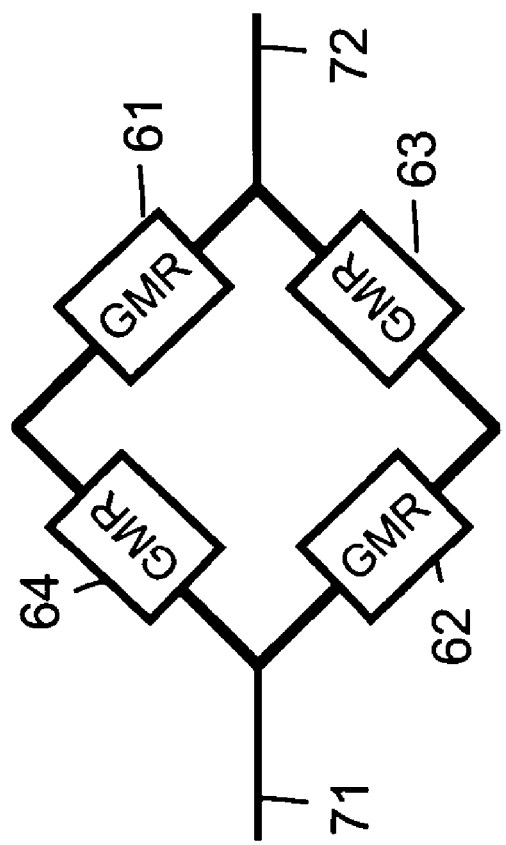

For example, GMR device 61, GMR device 63, GMR device 62 and GMR device 64 are connected together in a wheatstone bridge configuration, as shown in FIG. 6. Voltage/impedance differences are detected between a lead 71 and a lead 72. Alternatively, other connection configurations, such as a half bridge configuration, can be used to connect together GMR devices 61 through 64.

Figure 7:
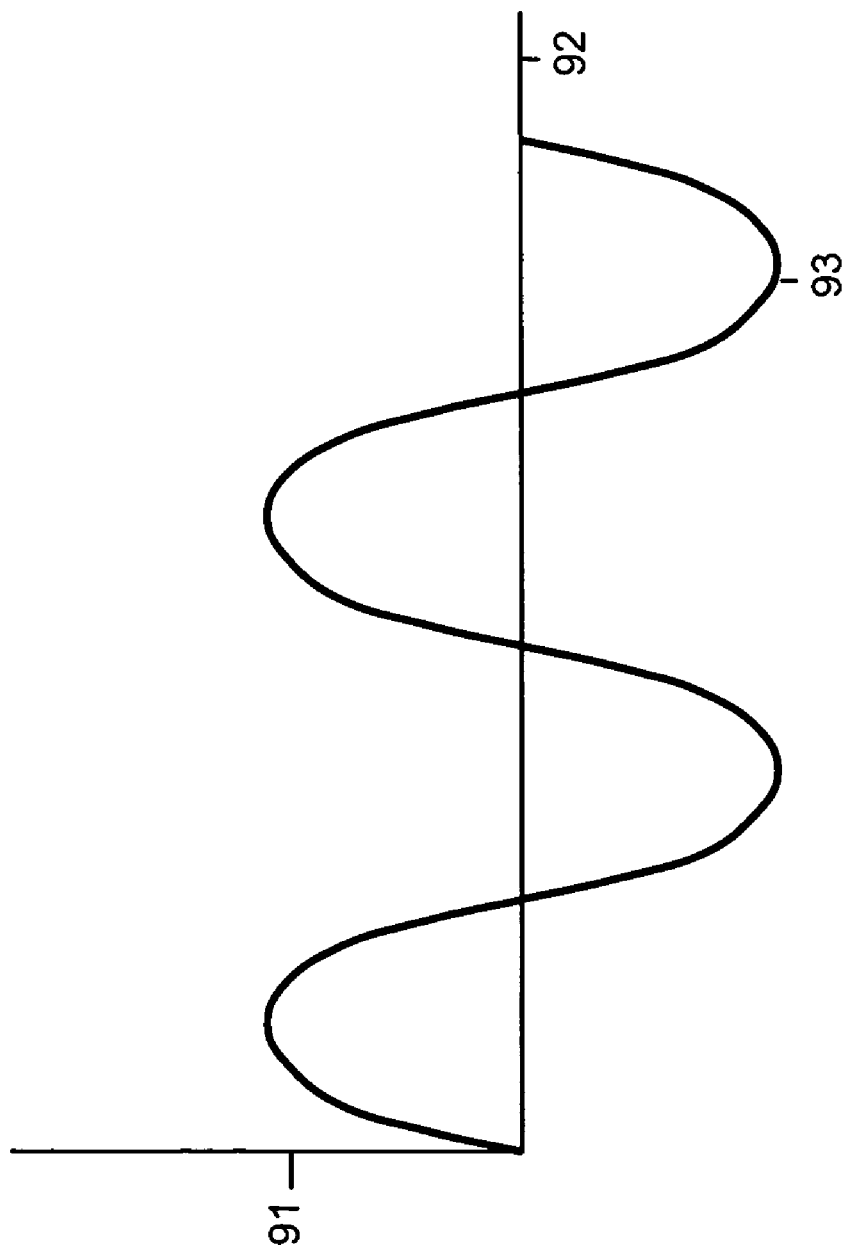
FIG. 7 illustrates potential output from a GMR sensor.

FIG. 7 shows an example waveform 93 resulting from a GMR sensor that is implemented using a full bridge configuration of GMR devices. An axis 91 represents voltage and an axis 92 represents time as the GMR sensor detects alternate poles on a rotating media platter. Waveform 93 allows for effective interpolation of positioning information facilitating resolution of angular position at a resolution higher than the pitch of data stored on a media platter.

Figure 8:
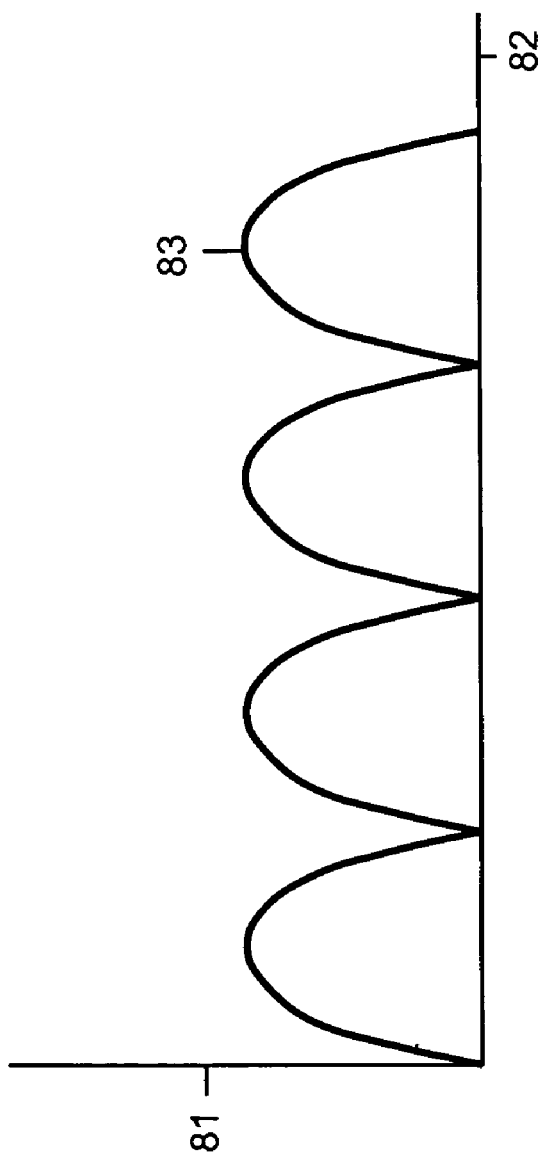
FIG. 8 illustrates potential output from a GMR sensor.

FIG. 8 shows an example waveform 83 resulting from a GMR sensor that is implemented using a half bridge configuration of GMR devices. An axis 81 represents voltage and an axis 82 represents time as the GMR sensor detects alternate poles on a rotating media platter. Waveform 83 facilitates digital monitoring of angular position of a media platter.

Figure 9:
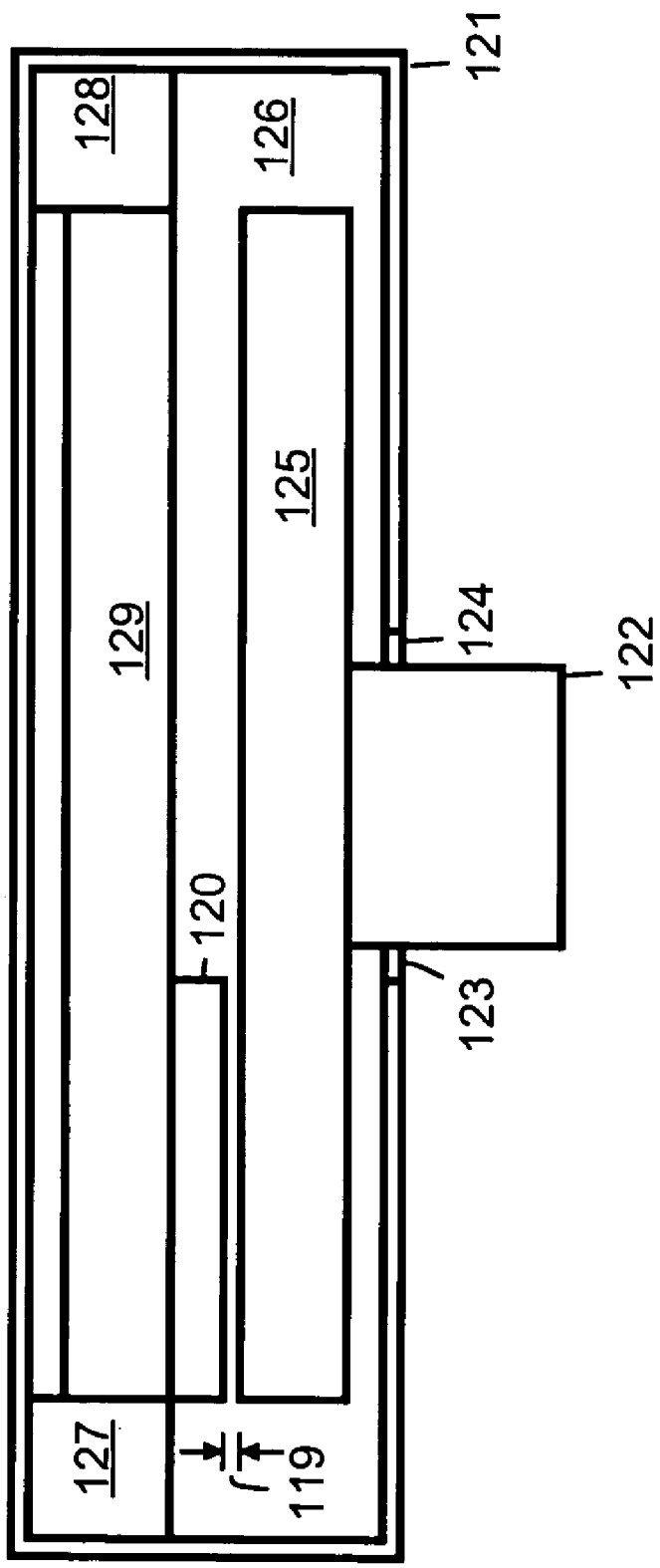
FIG. 9 is a simplified side view of a rotary and angular position sensor in accordance with another embodiment of the present invention.

Multiple tracks can be utilized to encode location data and to provide a digital signature for discreet angular rotation positions. For example, FIG. 9 is a simplified side view of a rotary and angular position sensor. Within housing 121, a media platter 125 is connected to an encoder shaft 122. For example, the encoder shaft 122 is connectable to a motor or other entity that requires position sensing for a rotating movement. Bearings 123 facilitate rotation of encoder shaft 122. A panel 127 is mounted on housing 121 using rigid mount 127. Multiple giant magneto-resistance (GMR) sensors 120 are mounted on panel 129 with a gap 119 separating multiple GMR sensors 120 from magnetic platter 125. For example, gap 119 is less than half the pitch distance of data. The medium located between multiple GMR sensors 120 and magnetic platter 125 is a non-magnetically-shielding material such as air. Other supporting electronics, etc., can also be mounted onto panel 129.

Figure 10:
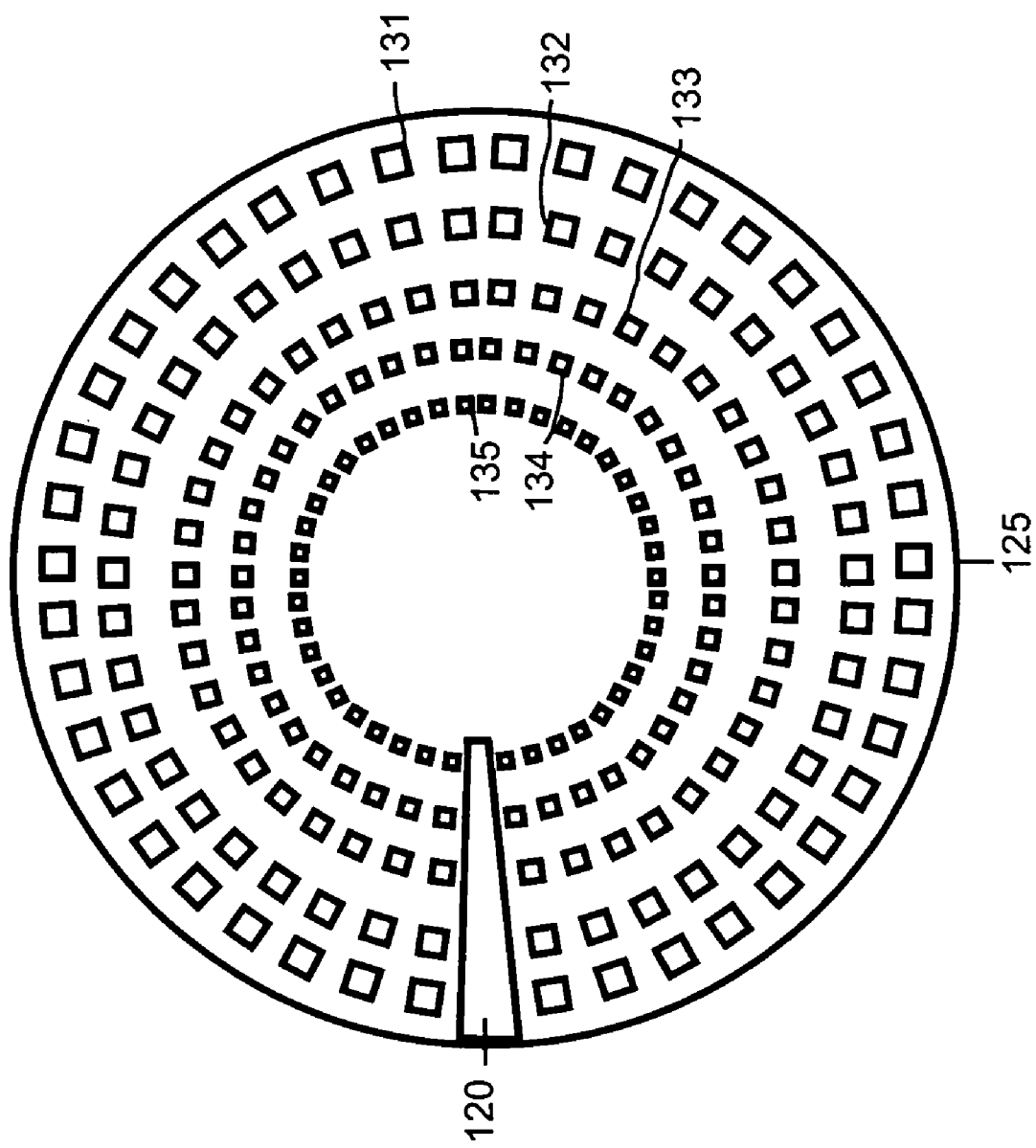
FIG. 10 is a simplified top view of a media platter within a rotary and angular position sensor in accordance with another embodiment of the present invention.

FIG. 10 is a simplified top view of media platter 125. For example, media platter 125 is a disk formed of glass and/or metallic material with a coating of thin film material. For example, the thin film material is FeO or some other material that possesses magnetic properties. Multiple tracks of data are patterned onto media platter 125. For example, a track 131, a track 132, a track 133, a track 134 and a track 135 are shown in FIG. 10. Tracks 131 through 135 are exemplary. Typically there are more than five tracks. For example, each track has the same number of angularly aligned locations and there are a sufficient number of tracks to allow the recording of a unique signature for each discreet angular rotation position. For example, for each discreet angular rotation position, multiple GMR sensors 120 read one bit of data from each track. The resulting data from all the tracks at each discreet angular rotation position encode a unique signature for that discreet angular rotation position. In this way, data values read by multiple GMR sensors 120 give a unique signature for each discreet angular rotation position, allowing absolute monitoring of angular positions of media platter 125.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A device that monitors angular position, comprising:
a media platter including:
a plurality of tracks of data encoded on a surface of the media platter, wherein a digital signature is stored for each of a plurality of discreet angular rotation positions, each digital signature comprising one bit of data from each track of the plurality of tracks of data; and,
sensor system that can detect the digital signature that is stored for each of the plurality of discreet angular rotation positions.

2. A device as in claim 1 wherein the sensor system comprises a magneto-resistance sensor located adjacent to the media platter and situated so that resistance of a magneto-resistant device within the magneto-resistance sensor is affected by rotation of the media platter.

3. A device as in claim 2 wherein the magnet resistance sensor is a giant magneto-resistance sensor.

4. A device as in claim 2 wherein the magnet resistance sensor is a giant magneto-resistance sensor including the magneto-resistant device and additional magneto-resistant devices arranged in a full bridge configuration.

5. A device as in claim 2 wherein the magnet resistance sensor is a giant magneto-resistance sensor including the magneto-resistant device and at least one other magneto-resistant device arranged in a half bridge configuration.

6. A device as in claim 2 additionally comprising:
electronic circuitry that receives information from the magneto-resistance sensor and interprets angular position.

7. A device as in claim 2:
wherein the sensor system includes additional magneto-resistance sensors so that there is one magneto-resistance sensor for each track of the plurality of tracks of data.

8. A method for monitoring angular position, comprising:
encoding a plurality of tracks of data on a surface of a media platter, wherein a digital signature is stored for each of a plurality of discreet angular rotation positions, each digital signature comprising one bit of data from each track of the plurality of tracks of data; and, detecting the plurality of discreet angular rotation positions with a sensor system that reads the digital signature that is stored for each of the plurality of discreet angular rotation positions.

9. A method as in claim 8 wherein the sensor system comprises a magneto-resistance sensor located adjacent to the media platter, wherein the magneto-resistance sensor is situated so that resistance of a magneto-resistant device within the magneto-resistance sensor is affected by rotation of the media platter.

10. A method as in claim 9 additionally comprising:
forming the magneto-resistance sensor by arranging the magneto-resistant device and additional magneto-resistant devices in a full bridge configuration.

11. A method as in claim 9 additionally comprising:
forming the magneto-resistance sensor by arranging the magneto-resistant device and at least one other magneto-resistant device in a half bridge configuration.

12. A method as in claim 9 additionally comprising:
interpreting angular position based on information from the magneto-resistance sensor.

13. A method as in claim 8 wherein detecting the plurality of discreet angular rotation positions includes:
monitoring data on each of the plurality of tracks using magneto-resistance sensors.

14. A device that monitors angular position, comprising:
media means for storing a plurality of tracks of data on the surface of the media means, wherein a digital signature is stored for each of a plurality of discreet angular rotation positions, each digital signature comprising one bit of data from each of the plurality of tracks of data; and, sensor means for sensing the plurality of discreet angular rotation positions by reading the digital signature that is stored for each of the plurality of discreet angular rotation positions.

15. A device as in claim 14 wherein the sensor means includes rotation detecting means being located adjacent to the media means, wherein the rotation detecting means is situated so that resistance of a magneto-resistant device within the rotation detecting means is affected by rotation of the media means.

16. A device as in claim 15 wherein the rotation detecting means includes additional magneto-resistant devices, the magneto-resistant device and the additional magneto-resistant devices being arranged in a full bridge configuration.

17. A device as in claim 15 wherein the rotation detecting means includes at least one additional magneto-resistant device, the magneto-resistant device and the least one additional magneto-resistant device being arranged in a half bridge configuration.

18. A device as in claim 15 wherein the sensor means additionally comprises:
circuitry means for receiving information from the rotation detecting means and interpreting angular position.

19. A device as in claim 15 wherein the rotation detecting means monitors data on all tracks in the plurality of tracks of data.

20. A device as in claim 15 wherein the rotation detecting means comprises a giant magneto-resistance sensor.

* * * * *